(No Model.) 4 Sheets—Sheet 1.

G. F. PALM & M. SMITH.
CIGAR BUNCHING MACHINE.

No. 402,766. Patented May 7, 1889.

Witnesses
M. Fowler
E. G. Siggers

Inventors
Maro Smith and
Gotlieb F. Palm
By their Attorneys
C. A. Knowles

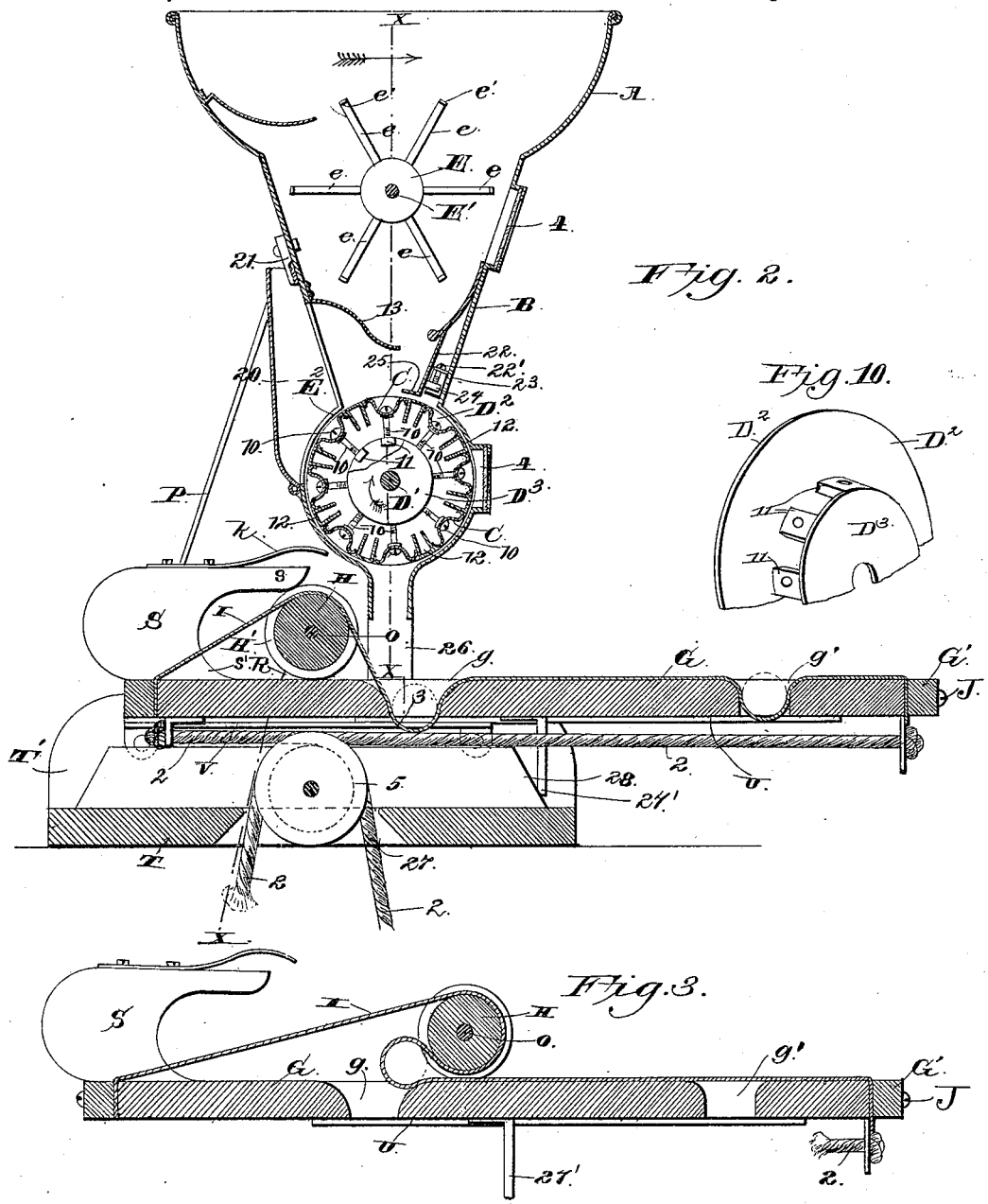

(No Model.) 4 Sheets—Sheet 3.

G. F. PALM & M. SMITH.
CIGAR BUNCHING MACHINE.

No. 402,766. Patented May 7, 1889.

Witnesses.
M. Fowler
E. G. Siggers

Inventors
Maro Smith and
Gottlieb F. Palm
By their Attorneys (No Model.) 4 Sheets—Sheet 4.

G. F. PALM & M. SMITH.
CIGAR BUNCHING MACHINE.

No. 402,766. Patented May 7, 1889.

Witnesses
M. Fowler
E. G. Siggers

Inventors
Maro Smith and
Gotlieb F. Palm
By their Attorneys

UNITED STATES PATENT OFFICE.

GOTLIEB F. PALM AND MARO SMITH, OF COSHOCTON, OHIO, ASSIGNORS OF ONE-THIRD TO SAMUEL IRVINE, OF SAME PLACE.

CIGAR-BUNCHING MACHINE.

SPECIFICATION forming part of Letters Patent No. 402,766, dated May 7, 1889.

Application filed July 12, 1888. Serial No. 279,773. (No model.)

*To all whom it may concern:*

Be it known that we, GOTLIEB F. PALM and MARO SMITH, citizens of the United States, residing at Coshocton, in the county of Coshocton and State of Ohio, have invented certain new and useful Improvements in Cigar-Bunching Machines; and we do hereby declare the following to be a full, clear, and exact description of the same, such as will enable others skilled in the art to which it appertains to make and use the same.

This invention relates to cigar-bunching machines, and has for its object to provide simple and convenient means for reciprocating the bunching-table, operating the pocket-wheel, actuating the agitator, and removing the waste material from between the base and the bunching-table at one and the same operation; to contrive a novel pocket-wheel in which the capacity of the pocket can be readily varied to meet the demands of different-sized fillers; to devise a construction whereby the bunching-roller is adjustable and is held down yieldingly to accommodate itself to the filler as it drops from the pocket-wheel; to provide means for elevating the bunching-roller at the time the filler drops from the pocket-wheel or a moment before the filler drops, and, finally, to provide a machine that will comprise a minimum number of parts, that will be compact, that will be readily accessible in all its parts, and perform its work in a rapid and efficient manner.

The improvement consists in the peculiar construction and combination of parts, which hereinafter will be more fully described and claimed.

Figure 1:
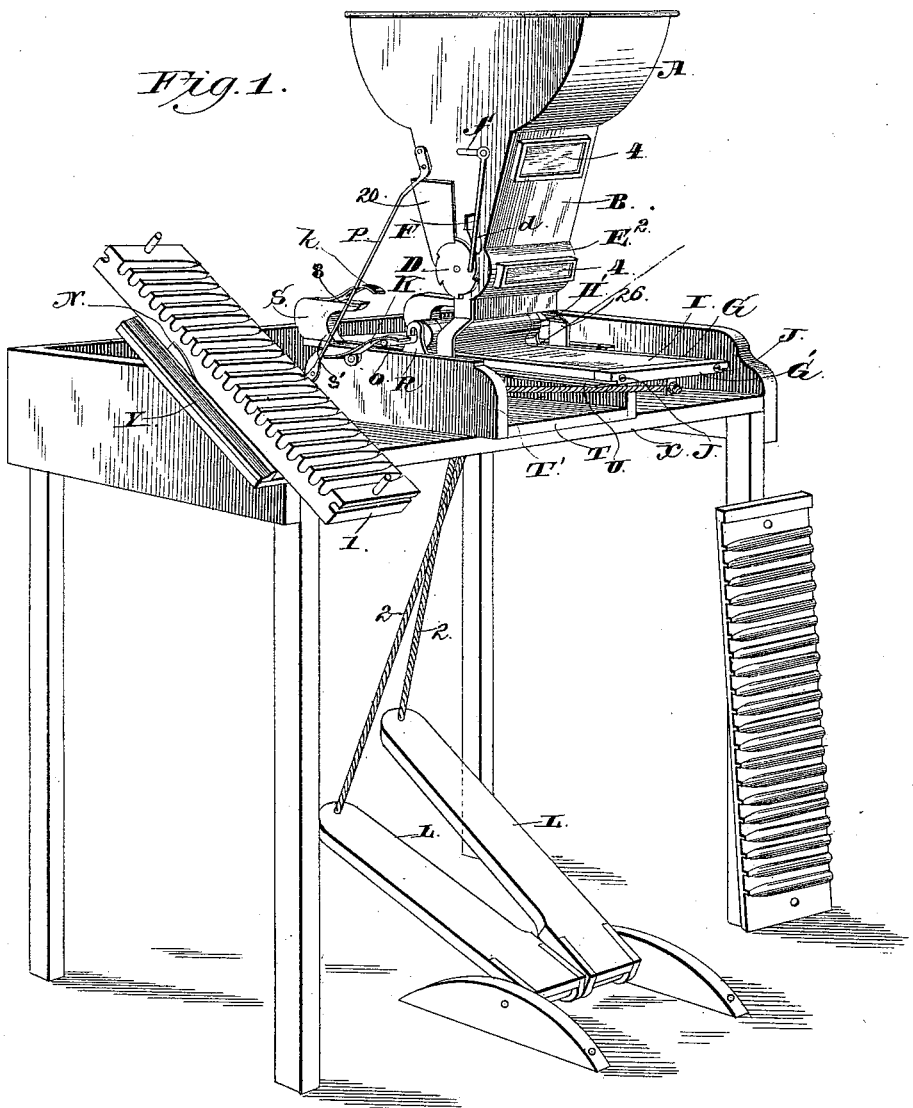
Figure 9:
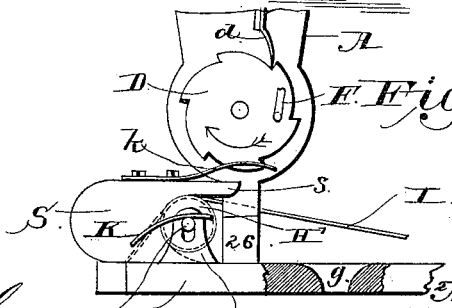
Figure 4:
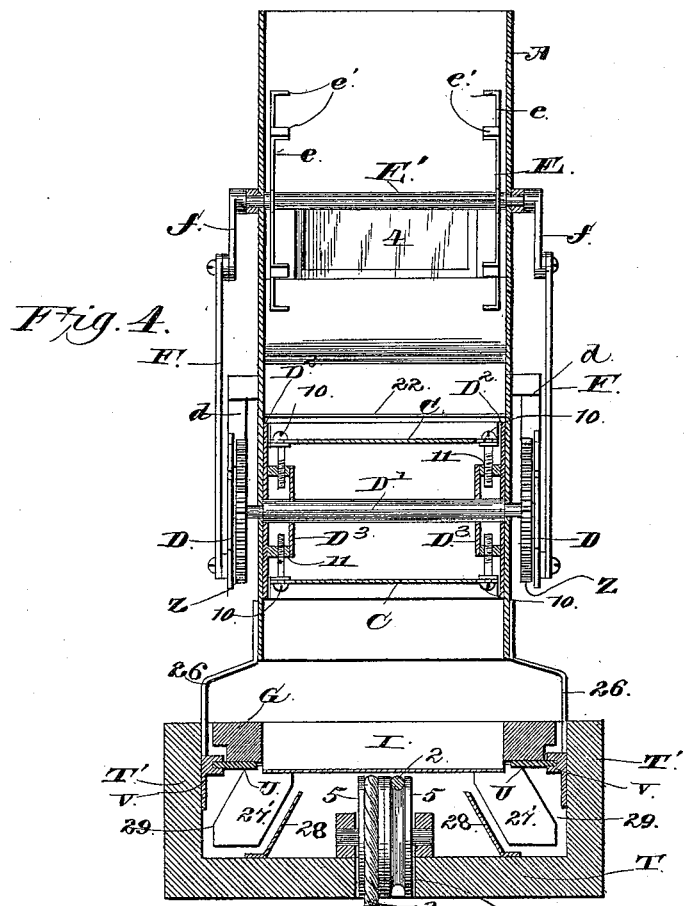
Figure 5:
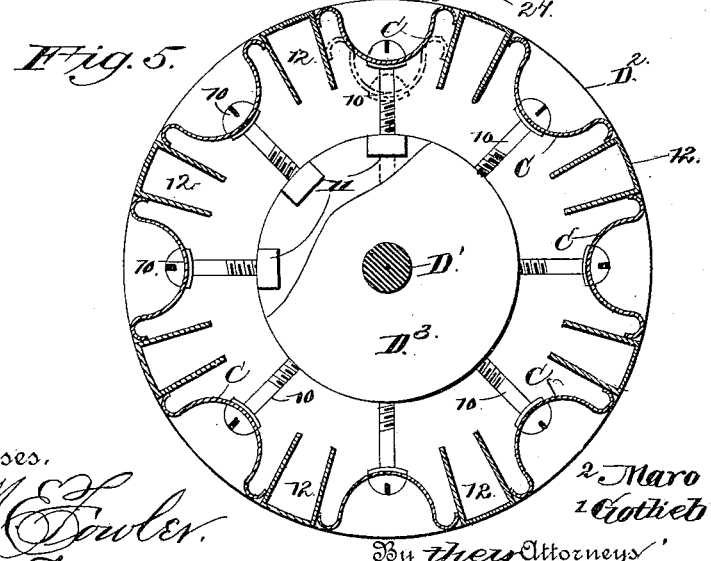
Figure 6:
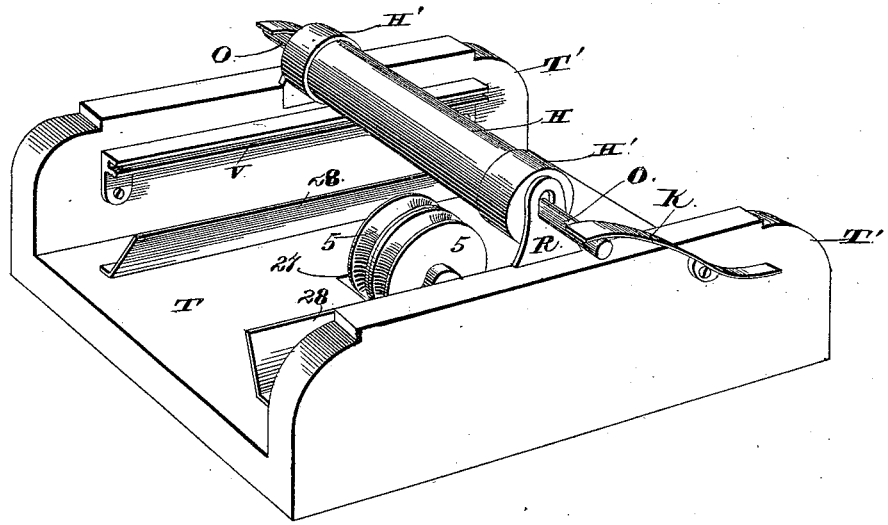
Figure 7:
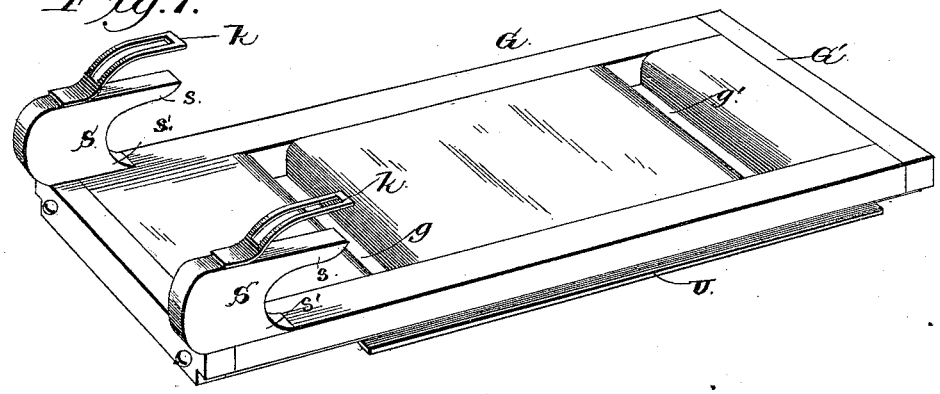
Figure 8:
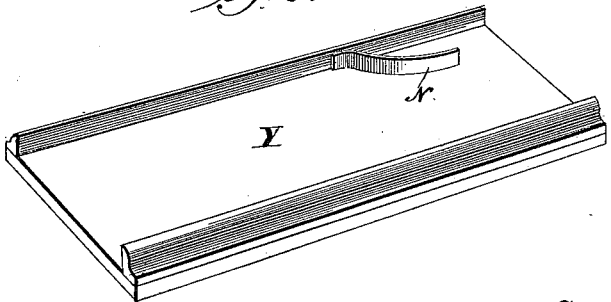

In the drawings, Figure 1 is a perspective view of a cigar-bunching machine embodying our improvements. Fig. 2 is a vertical central section through the entire machine, showing by dotted lines the filler dropped from the pocket-wheel and resting on the bunching-cloth. Fig. 3 is a longitudinal section through the bunching-table, showing the operation of the same. Fig. 4 is a vertical cross-section of the machine on the line $x\ x$ of Fig. 2, looking toward the front, as indicated by arrow in Fig. 2. Fig. 5 is a cross-section of the pocket-wheel on an enlarged scale, showing the manner of adjusting the capacity of the pockets. Fig. 6 is a perspective view of the base, showing the bunching-roller in position. Fig. 7 is a perspective view of the bunching-table. Fig. 8 is a perspective view of the cigar-mold holder. Fig. 9 is a detail view showing the bunching-table in position to actuate the pocket-wheel, and Fig. 10 is a detail perspective view of a portion of the pocket-wheel.

The hopper A is of ordinary construction, having flaring sides and a contracted portion, B, within which is located the agitator E, composed of the shaft $E'$, journaled at its ends in the sides of the hopper, and the radial arms $e$, near each end of the shaft, which have their ends bent inward to form the agitator-fingers $e'$. The ends of the shaft $E'$ are extended beyond the sides of the hopper and have the cranks $f$ keyed thereto, which are connected with the ratchet-wheels D on the pocket-wheel $D'$ by the pitmen F.

The pocket-wheel is located directly below the agitator and is arranged in the case $E^2$, which forms a continuation or part of the hopper, and its shaft $D'$ is journaled in the sides of the hopper. The heads $D^2$ of the pocket-wheel are fastened to the shaft $D'$, and the transverse partitions 12 are secured between the heads and are V-shaped in cross-section, the sides of the partitions forming the sides of the pockets. The bottoms C of the pockets fit snugly between the heads $D^2$ and are adjustable radially by the set-screws 10, which have their heads provided with annular grooves, which are engaged by the edges or sides of the slots at each end of the bottoms, the inner ends of the screws being fitted in the stationary nuts 11, which are secured to the heads $D^2$ at one end and to the disks $D^3$ at their other ends. By this construction, it will be noticed, the heads of the screws are swiveled to the bottoms C, so that by turning the screws in the proper direction the bottoms will be moved inward or outward, as will be readily understood. The partitions 12 are formed of sheet metal, which is bent in the form shown, and they serve to prevent the tobacco falling through the spaces between the pockets into the interior of the wheel.

By providing the partitions with the inclined sides the opening or space between the partitions is made to flare outwardly, so that when the pocket containing the tobacco is at the lowest point of the wheel the bottom of the said space will be larger than the top and the discharge of the tobacco will be positive and uninterrupted. The front part of the hopper opposite the agitator and the front of the pocket-wheel case are closed by glass panes 4, through which the operation of the agitator and the pocket-wheel can be viewed. There is a space between the agitator and the pocket-wheel, which is closed in its rear by the deflector 13, which is secured to the rear side of the hopper and extends over the said space and prevents the filler dropping down on the rear half of the pocket-wheel. The rear side of the hopper, directly below the deflector 13, is closed by the door 20, which embraces the sides of the hopper and is hinged at its lower end and is held closed by the turn-button 21, the hopper and casing being open beneath the said door 20.

The gage 22 is L-shaped in cross-section, and is located in front of and nearly above the pocket-wheel, and can be adjusted to and from the pocket-wheel by the set-screws 22', which pass through brackets 23 on the front side of the hopper and screw into the nuts or threaded lugs 24 on the gage. The lip 25, at the lower end of the gage, extends over the pocket-wheel and compresses the filler in the pockets thereof. It will be seen that as the pocket-wheel rotates the loose tobacco on the partitions will be carried against this gage and by it swept into the pockets, and by properly adjusting the gage the amount of tobacco fed into the pockets can be controlled.

The hopper is supported on the base by the brackets or rods 26, and is steadied by the braces P. The base, composed of the bottom T and the sides T', is fastened to the bench X, of any ordinary form, on which it is supported. The bottom T of the base has an opening, 27, near or in the center, in which the double pulley or the two rollers 5 5 are journaled. The sides T' of the bottom T are provided with the slotted castings R, which receive the ends of the shaft O of the bunching-roller, the shaft being held in the brackets by the springs K, which are fastened at one end to the sides T' of the base and have their free ends bearing on the ends of the shaft O. The bunching-roller is composed of the side rollers, H', which run on the bunching-table G near its edges, and the central roller, H, the three rollers being loosely mounted on the shaft O, and the central roller, H, being of less diameter than the end rollers, so as to be out of contact with the bunching-table and allow room for the apron between the roller and the table. The rollers are independently mounted on the shaft, so as not to interfere with each other in their movements as they rotate in contrary directions.

The bunching-table G, having the receiving-opening $g$ and the discharging-opening $g'$ at its opposite ends, is adapted to travel back and forth on the base beneath the bunching-roller. The edges of the bunching-table are rabbeted, and the plates U, secured to the under side of the bunching-table, enter the grooves on the bars V, secured to the sides T' of the base, and form guide-bearings for the said bunching-table. The bunching apron or cloth I is secured at one end to the end of the bunching-table, and its other end is attached to the opposite end of the table by a clamping-bar, G', which is held to the table by set-screws J. The bunching apron or cloth passes over the bunching-roller, and is lengthened or shortened to vary the size of the bight 3 therein by releasing the set-screws, so that the bar G' can be moved away from the bunching-table, after which the apron can be manually adjusted and the clamping-bar then again secured to the table, as will be readily understood. The ropes 2 pass over opposite sides of the rollers 5 5, and are attached at their upper ends to the opposite ends of the bunching-table and have their lower ends attached to the treadles L L. The brackets S, attached to the rear end of the bunching-table, have upper arms, $s$, and lower arms, $s'$.

The upper arms, $s$, support yielding or spring rods $k$, which are adapted to engage with the teeth of the ratchet-wheels D and move them forward to turn the pocket-wheel and drop a filler on the bunching-table at the beginning of its backward movement. The ends of the rods $k$ are slotted to receive the lower ends of the ratchet-wheels. The lower arms, $s'$, of the bracket S pass beneath the rollers H' and lift the bunching-roller against the tension of the springs $k$, thereby raising the apron and lifting the bight and the tobacco therein from the discharging-opening in the bunching-table.

The plates 28 28, extending parallel with the sides T' of the base and secured to the bottom T, form troughs 29 between them and the said sides T', which catch the droppings of tobacco from the bunching-table. The blades or cleaners 27' 27', secured to the under side of the bunching-table, extend into these troughs and push these droppings to the rear end of the base at each movement of the bunching-table, where they may be readily gathered.

The mold-holder Y is secured to one corner of the bench, and is dovetailed to secure the mold 1, which is adapted to slide therein. The spring N, fastened to the side of the holder, bears against the side of the mold and holds it against accidental displacement when adjusted on the said holder.

When the parts are in their initial positions, the bunching-table will be at the forward limit of its movement and the spring-rods $k$ will be in engagement with the ratchet-wheels D, as shown in Fig. 9. When it is desired to bunch cigars, the filling or tobacco is placed in the hopper, and motion is imparted to the bunching-table to draw it toward the rear of the machine by depressing one of the treadles L. As the table is drawn rearwardly, the spring-rods will act on the ratchet-wheels so as to rotate the same, and thereby turn the pocket-wheel, as will be readily understood, and the several parts are so arranged relatively to each other that just before the pocket-wheel is brought into position to drop the tobacco onto the apron the bunching-roller will be lowered, thereby allowing the apron to rest upon the bunching-table, and just as the pocket-wheel is brought into position to discharge the tobacco the receiving-opening in the table will be directly under the hopper, or nearly so, as shown in Fig. 2, so that the tobacco discharged from the pocket-wheel will fall onto the apron over the said opening and depress the same thereinto, thereby forming a bight in the apron. The continued movement of the table causes it to pass under the bunching-roller, the tobacco being thereby compressed in the bight of the apron and then drawn up out of the receiving-opening in rear of the bunching-roller, as shown in Fig. 3. As the table continues to move rearwardly under the bunching-roller, the bight will move toward the front end of the table until, when the table is at the rearward limit of its movement, the bight will slip into the discharging-opening. The shifting of the position of the bight will roll the tobacco into a compact bunch, ready to receive the wrapper. Upon returning the table to its initial position the bunch will remain in the discharging-opening until the arms s come into contact with the shaft O, when the bunching-roller will be raised and the apron lifted, thereby raising the bunch from the discharge-opening, so that it can be easily handled.

The bunching-table is returned to its initial position by operating the other treadle. Access is had to the deflector 13 and to the pocket-wheel, for adjusting the bottoms of the pockets, through the door 20.

It will be understood, of course, that many changes may be made in the minor details of construction of our device without departing from the principles of our invention. For instance, in place of the pitman F, connecting the agitator and the ratchet-wheels, any ordinary train of gearing may be employed to transmit motion between the agitator and the pocket-wheel. In Fig. 4 I have shown gear-wheels Z on the shaft D', which would form a part of such a train. The wheels composing the train, it will be readily understood, would be mounted on stub-shafts on the side of the hopper and mesh with gear-wheels on the shaft E'.

Having thus described our invention, we claim—

1. In a cigar-bunching machine, the combination of the hopper, the vertically-rotating pocket-wheel arranged below the hopper and having a ratchet-wheel secured on the end of its horizontal shaft, the sliding bunching-table below the pocket-wheel, and the spring-rod carried by the bunching-table and adapted to engage the ratchet-wheel, as set forth.

2. In a cigar-bunching machine, the combination of the hopper, the rotatable agitator-wheel therein, the rotatable pocket-wheel arranged beneath the hopper, gearing between the agitator and the pocket-wheel, the ratchet-wheels on the shaft of the pocket-wheel, the sliding bunching-table arranged below the pocket-wheel, and the spring-rods carried by the bunching-table and engaging the ratchet-wheels, as set forth.

3. In a cigar-bunching machine, the combination, with the hopper and the pocket-wheel, of the adjustable gage 22, substantially as described.

4. In a cigar-bunching machine, the combination, with the hopper and the pocket-wheel, of the adjustable gage having a lip projecting from its lower end, substantially as specified.

5. In a cigar-bunching machine, the combination, with the hopper and the pocket-wheel, of the brackets 23, secured to the side of the hopper, the gage 22, having the nuts 24 secured thereto, and the set-screws 22, for adjusting the gage.

6. In a cigar-bunching machine, the herein-described pocket-wheel composed of a shaft having heads at each end, the partitions 12, V-shaped in cross-section, secured between the heads, the nuts 11, secured between the heads and disks contiguous thereto, the bottoms C of the pockets, and the set-screws 10, for adjusting the bottoms of the pockets, substantially as specified.

7. In a cigar-bunching machine, the pocket-wheel consisting of the heads, the partitions 12, the nuts 11 on rings $D^3$, the concave bottoms C, having notches in each end, and the set-screws having grooves in their heads and having their lower ends secured in the said nuts, substantially as described.

8. The combination, with the heads $D^2$ and the transverse partitions 12, bent in substantially the form shown, of the trough-shaped bottoms C, and the set-screws 10, for adjusting the bottoms, substantially as and for the purpose described.

9. The herein-described agitator for a cigar-bunching machine, composed of the shaft E' and the radial arms e, at the ends of the shaft, having their ends bent inward to form agitator-fingers, substantially as specified.

10. In a cigar-bunching machine, the combination, with the base and the reciprocating bunching-table, of the castings R, having slots, the bunching-roller mounted in the slots, and the arms s' on the bunching-table, for effecting a vertical movement of the bunching-roller in the said castings, substantially as described.

11. The combination of the base, the slotted castings thereon, the bunching-roller having its shaft mounted in said castings and extended beyond the same, the springs secured to the base and bearing on the shaft of the bunching-roller, and the bunching-table reciprocating under the bunching-roller and having arms adapted to come in contact with the roller and raise the same, as set forth.

12. In a cigar-bunching machine, the combination of a base, a pocket-wheel arranged above the base, the bunching-roller mounted loosely in slotted bearings on the base, the reciprocating bunching-table, and the brackets S, secured on the bunching-table, and having upper arms adapted to actuate the pocket-wheel and lower arms adapted to raise the bunching-roller, as set forth.

13. The combination, with the base and plates 28, forming troughs near each side of the base, of the reciprocating bunching-table having cleaner-blades which are adapted to travel in the said troughs, substantially as set forth.

In testimony that we claim the foregoing as our own we have hereto affixed our signatures in presence of two witnesses.

GOTLIEB F. PALM.
    MARO SMITH.

Witnesses:
 WM. R. GAULT,
 JNO. H. WALKER.